United States Patent [19]

Jackson, Jr.

[11] E Patent Number: Re. 32,654

[45] Reissued Date of Patent: Apr. 26, 1988

[54] WIDE AIR GAP PERMANENT MAGNET MOTORS

[76] Inventor: John T. Jackson, Jr., 201 S. Harrison, Newberg, Oreg. 97132

[21] Appl. No.: 855,515

[22] Filed: Apr. 23, 1986

Related U.S. Patent Documents

Reissue of:

[64] Patent No.: 4,445,061
Issued: Apr. 24, 1984
Appl. No.: 401,134
Filed: Jul. 23, 1982

U.S. Applications:

[63] Continuation of Ser. No. 160,315, Jun. 17, 1980, abandoned, which is a continuation-in-part of Ser. No. 055,266, Jul. 6, 1979, abandoned.

[51] Int. Cl.[4] ..... H02K 21/12

[52] U.S. Cl. ..... 310/156; 310/154; 310/181

[58] Field of Search ..... 310/40, 44, 46, 181, 310/154, 156, 179, 180, 254, 256

[56] References Cited

U.S. PATENT DOCUMENTS

| | | | |
|---|---|---|---|
| 2,885,645 | 5/1959 | Wennerberg | 310/44 X |
| 2,952,788 | 9/1960 | Volkering et al. . | |
| 3,360,668 | 12/1967 | Faulhaber . | |
| 3,657,583 | 4/1972 | Tamaru | 310/156 X |
| 3,731,533 | 5/1973 | Geery . | |
| 3,891,876 | 6/1975 | Herr et al. | 310/154 X |
| 3,909,645 | 9/1975 | Herr et al. | 310/43 X |
| 3,979,619 | 9/1976 | Whiteley | 310/268 |
| 3,999,092 | 12/1976 | Whiteley | 310/156 |
| 4,019,075 | 4/1977 | Kagami . | |
| 4,021,692 | 5/1977 | Whiteley | 310/237 |
| 4,063,123 | 12/1977 | Herr et al. | 310/270 |
| 4,068,143 | 1/1978 | Whiteley | 310/268 |
| 4,080,540 | 3/1978 | Karube . | |
| 4,130,769 | 12/1978 | Karube | 310/179 X |
| 4,135,107 | 1/1979 | Kamerbeck et al. | 310/179 |

FOREIGN PATENT DOCUMENTS

| | | | |
|---|---|---|---|
| 604613 | 11/1945 | United Kingdom . | |
| 760269 | 10/1956 | United Kingdom | 310/44 |
| 972364 | 8/1963 | United Kingdom . | |
| 1349746 | 6/1970 | United Kingdom . | |

OTHER PUBLICATIONS

Schuisky, Application of Permanent Magnets in Electrical Machines, *Elektrotechniek*, vol. 52, No. 6, pp. 326–332, 1974.

Siemens, Introducing a New Concept in Miniature D.C. Motors, Bulletin: 1AD, 6.

Kamerbeek, On the Theoretical and Experimental Determination of the Electric Torque in Electric Machines, *Phillips Research Reports*, Supplement No. 4, 1970.

Kamerbeek, Scaling Laws for Electric Motors, *Philips Technical Review*, vol. 35, No. 4, pp. 116–123, 1975.

Kamerbeek, Torque Measurements on Induction Motors Using Hall Generators or Measuring Windings, *Philips Technical Review*, vol. 34, No. 7, pp. 153–162, 1974.

(List continued on next page.)

*Primary Examiner*—Mark O. Budd

*Attorney, Agent, or Firm*—Stoel Rives Boley Jones & Grey

[57] ABSTRACT

A rotating electric machine with a permanent magnet rotor, provided with a stator composed of a winding and a ferrite structure to provide low power losses and improved efficiency particularly at high rotor revolution rates, is constructed so as to optimize the performance of the permanent magnets on the rotor. In the preferred embodiment of the invention, the ferrite being selected for its low hysteresis and eddy current power losses, generically referred to as core loss and its low loss factor which are frequency dependent, replaces laminated electrical iron. Additionally the permanent magnets selected to exhibit high intrinsic magnetic intensity and low remanent magnetic flux density, are arranged in conjunction with the ferrite to maximize the magnet's energy product as well as the magnetic circuit gap length, which in a combination provides a radical improvement in machine energy density.

5 Claims, 3 Drawing Sheets

OTHER PUBLICATIONS SEE TOP SHEET

Kamerbeek, Electric Motors, *Philips Technical Review*, vol. 33, No. 89, pp. 215-234, 1973.

Wentworth and Ellis, Permanent Magnets II—Stabilization Prediction for Permanent Magnet Field Motors and Generators, *Journal of Applied Physics*, vol. 37, No. 3, pp. 1143-1146, 1966.

Ireland, New Figure of Merit for Ceramic Permanent Magnet Material Intended for DC Motor Applications, *Jour. of App. Physics*, vol. 38, No. 3, pp. 1011-1012, 1967.

Lakerveld, High Speed Solid Rotor Induction Motors, *Philips Technical Review*, vol. 34, No. 7, pp. 170-179, 1974.

*Permanent Magnets and their Applications*, by Parker et al, John Wiley & Sons, Inc. 1962.

*A Novel DC Motor Using Rare Earth Magnets*, talk by W. Jaffe, May 16, 1974.

Proceedings of the Second International Workshop on Rare Earth-Cobalt Permanent Magnets and Their Applications, University of Dayton, Jun. 8-11, 1976.

WIDE AIR GAP PERMANENT MAGNET MOTORS

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of application Ser. No. 160,315, filed June 17, 1980, which is a continuation-in-part of application Ser. No. 055,266, filed July 6, 1979, both now abandoned.

BACKGROUND OF THE INVENTION

The invention relates to rotating electric machinery; it relates, more particularly to electric motors and generators in which maximum mechanical power per unit volume is increased over conventional designs for comparable efficiencies at low revolution rates. Further, at elevated revolution rates, core losses in the stator as a result of alternating currents in the stator winding and alternating magnetic fields in the stator due to the rotating magnetic rotor are reduced by means of a ferrite core upon which the stator winding is fixed.

In the text hereof, the following terms will be used from time to time and their respective meanings are set forth below for convenient reference:

(1) Magnetic Flux—A characteristic of an energy field produced by a magnetomotive force. When this state is altered in magnitude, a voltage is induced in an electric conductor linked with it. The flux is thought to be a line or lines (imaginary).

(2) Magnetic Flux Density (B)—The magnitude of flux perpendicularly passing through a unit area.

(3) Saturation Magnetic Flux Density ($B_s$)—The maximum magnetic flux density that can be induced in a material. It is the measured magnetic flux density minus that of vacuum space.

(4) Remanent Magnetic Flux Density ($B_r$)—The Magnetic flux density of a material remaining after it has been saturated and the magnetic field intensity has been subsequently reduced to zero.

(5) Magnetic Field Intensity (H)—A characteristic of an energy field related to the magnetomotive force by a line integral. It is commonly referred to as a coercive force and is generated by current loops or a permanent magnet.

(6) Intrinsic Magnetic Field Intensity ($H_i$)—is the magnetic field intensity required to reduce the magnetic flux density in a material to zero after it has been saturated.

(7) Magnetomotive Force (F)—The spacial distribution of the time derivative of charge whereby the magnetic field is manifested.

(8) Energy Product (BH)—A convenient unit in engineering whereby permanent magnets are compared; the product of the magnetic flux density and the magnetic field intensity at a point on the demagnetization curve of a material; units of energy per volume.

(9) Maximum Energy Product ($BH_{max}$)—The product of B and H which is larger than any other point on the demagnetization curve.

(10) Energy Density (E/V)—The energy per unit volume in cgs units found by dividing the energy product by 8.

(11) Balanced Circuit—A magnetic circuit dimensioned so that the magnetomotive forces are efficaciously distributed.

(12) Operating Point—That point on the magnet demagnetization curve for which the magnetic circuit is statically balanced.

(13) Cogging—A characteristic of electrical machines employing toothed components such that torque is required to rotate the rotor a displacement of one tooth to the next-used to advantage in stepper motors.

Traditional designs employing permanent (magnetically "hard") ferrite magnets, typically barium or strontium ferrite, or rare-earth magnets, typically samarium cobalt, operate the magnet near the remanent magnetic flux density while maintaining a small gap although large enough to permit economical fabrication. The magnet flux is made to flow through a slotted iron laminated stator with the winding coils inserted into the slots. The primary difficulty with this approach appears when the width of the teeth are reduced, thus, enlarging the slots which when taken to an optimum magnetic circuit, meaning maximization of the magnet energy product, results in mechanically unsound structures. Generally, designs employing permanent ferrite or rare-earth magnets are patterned after designs employing Alnico magnets, where, in fact, the rule of thumb is to minimize the air gap length. It is a common belief that maximizing the circuit magnetic flux, which in effect is to operate near the remanent magnetic flux density, generically speaking, produces "the most powerful configuration." This approach ignores the fact that the magnets are operating far from the maximum energy product, and in fact, comparing maximum energy products between Alnico and rare-earth, suggests that a rare-earth magnet motor should be at least three times as "powerful."

The designers of rotating electric machinery have been traditionally aware of the substantial role core loss plays in the operation of electric motors and generators, such core loss resulting as heat in the stator, since the permissible temperature rise of the materials utilized to insulate the conductors in these components and the degradation of magnetic properties of magnetic materials with temperature rise sets a practical limit to the reduction in size and improvement in efficiency of their products. Furthermore, the core loss being sensitive to the frequency of the alternating current in the stator core and the frequency of the alternating magnetic fields in the stator due to the rotating magnetic rotor and enhanced as the frequency is increased sets additional limits on maximum operating frequency of the winding as well as the revolution rate of the rotor.

Not withstanding the difficulties of heat generated within the stator core, the permeability of the prior art laminated electrical iron stator core decreases as the frequency of the alternating current in the stator winding increases and the frequency of the alternating magnetic fields due to the rotating magnetic rotor increases. This results in nonlinear motor characteristics becoming exaggerated as the frequencies increase appearing as a loss of torque at high revolution rates.

Prior art is typified by design "rules of thumb" which constitute design practices based on popular belief. It is further asserted that these practices are applied to electrical rotating machines irrespective of type. In particular, they are (1) maintenance of a gap as short as possible. (2) the incompatibility of soft magnetic ferrite and permanent magnets, and (3) operation of the magnets close to the remanent point to achieve the greatest "power."

Minimizing the air gap is utilized to maintain the magnetic fields predominantly in the rotor and stator, that portion in the gap being unusable. The reluctance of the gap generally being quite large demands a significant portion of the magnet volume to sustain, as well as induction motors which also require a significant portion of the total ampere turns to sustain. Obviously, there is a spacial utility of the magnetic field based on the intent of the structure as is illustrated by the U.S. Pat. No. 2,885,645, it being an induction type machine employing a magnetically "soft" ferrite (i.e. non-permanent magnet) in both the stator and rotor. In any case, the stator structure in which the winding is embedded or inserted into slots therein, supports the magnetic field and couples that field to the winding, requiring significantly less magnetomotive force to maintain than air. It is a hitherto unsuspected discovery of the invention that a substantial magnetic field in a widened air gap, despite the relatively large magnetomotive force to maintain it, can be achieved provided a judicious selection of permanent magnets and efficacious utilization of that field by placing the stator winding into the gap is made.

The principal reliance of the prior art has been on the use of any permanent magnet material in conjunction with an iron laminated stator core. The magnetic flux density saturation of iron is greater than any known remanent magnetic flux density found in permanent magnet material, Alnicos having the highest known remanent field. The intent of the classical toothed iron core stator is to adjust the effective axially concentric cylindrical tooth cross-sectional areas such that a maximum magnetic flux is achieved providing for the total tooth cross-sectional area to be some fraction of the total axially concentric cylindrical area. This mechanism applied radially provides for the slots in which the winding is inserted. Consequently, this construction requires that the stator material saturation flux density be greater than the flux density operation point of the permanent magnet. Since the magnetic flux density saturation of magnetically soft ferrite materials is sometimes equal to but generally less than the remanent magnetic flux density of permanent magnets or generally favored operating points, the toothed stator core employing a magnetically soft ferrite is prohibited; and, for this reason, the two classes of materials is thought to be mutually incompatible.

SUMMARY OF INVENTION

The inventive machine design is effectuated by increasing the gap between the permanent magnet rotor and stator to the extent that the magnetic circuit is balanced for optimum magnet performance while applying the largest portion of the developed magnetomotive force a cross the gap. Utilization of the gap magnetic field is accomplished by placing the stator winding into the gap and dispensing with the conventional toothed stator construction. The stator core, then, serves to shape the gap field referred to mathematically as "imaging" and to provide a low reluctance return path at a minimum core loss. An added advantage of this construction is that "cogging" normally associated with toothed iron laminated cores is completely eliminated.

Although an iron laminated stator core may be used in the present invention, a molded magnetically soft ferrite cylindrical toroid shaped stator core is preferably used which offers a number of advantages over an iron laminated core of the same shape. The permeability of ferrite, in most cases, is at least an order of magnitude higher and persists to much higher frequencies than iron. The magnitude of the permeability offers such a low reluctance that, even though the same flux passes through the air gap as the stator core, little magnetomotive force is required to sustain it thus placing most of the magnetic energy in the gap.

It is a hitherto unsuspected discovery of the invention that permanent magnetic materials are compatible with magnetically soft materials such as magnetically soft ferrites, despite the fact that the saturation magnetic flux density of the magnetically soft material is no higher than the remanent magnetic flux density of the permanent magnet material and preferably equal to a lower flux density commensurat with the maximum energy product thereof, if a toothed stator core is not used. Therefore, the stator core takes on a cylindrical toroidal shape and the winding is inserted into the air gap which, to be practical, requires the permanent magnet material to exhibit as high an intrinsic magnetic intensity as possible so that the air gap may be widened. To effectuate the design, the energy density within the permanent magnets and the air gap is maximized and the energy within the stator core in minimized.

Permanent magnet materials suitable for use in the inventive machine are generally either a barium or strontium ferrite or a samarium cobalt (rare-earth). Alnico, generally aluminum-nickel-cobalt alloys, magnets are generally excluded as they are incompatible with magnetically soft ferrites for the reasons stated herein.

Although the inventive machine may be accomplished employing a toroidally shaped iron laminated stator core, magnetically soft ferrites exhibit much higher permeabilities facilitating a lower energy density for the same magnetic flux, are more economical to fabricate, and offer much less core loss particularly at high frequencies. The high frequency low core loss properties of magnetically soft ferrites have been used to an advantage in induction type rotating machines (i.e. having non-permanent magnet rotors) disclosed in U.S. Pat. No. 2,885,645 and British Pat. No. 760,269. The use of magnetically soft ferrite in these machines allows the use of higher efficiencies at high frequencies than would be achievable with iron or nicket alloys.

The principal reliance of the permanent magnet motor prior art has been on the provision of improved grades of electrical iron and means of heat transfer by conduction from the stator. For alternating current frequencies in the stator winding about 400 Hertz or rotor revolution rates greater than 20,000 revolutions per minute, the various grades of electrical iron do not offer significant advantages each grade becoming similar in their loss of magnetic properties. Generally the heat arising from core loss is conducted away from the stator through the motor housing and sunk into its mounting structure or cooled by means of a water jacket heat exchanger either method facilitating higher operating frequencies although the motor efficiency continues to decrease.

The reliance of the prior art on electrical iron and conductive heat transfer has resulted in manifold problems which complicate the size and simplicity of any high revolution rate or high frequency alternating current motor setting practical limits to these frequencies foresaking efficiency entirely.

Such methods and techniques of the prior art are obviated and improved in the permanent magnet electric motor of the invention, where the magnetically soft ferrite stator core embodies an added feature which principally is the means of core loss reduction and preservation of magnetic properties. Since the electromagnetic properties of the ferrite offer improvement over the electrical iron, not only is core loss greatly reduced eliminating elaborate cooling systems, the practical limits of the alternating current frequency and the rotor revolution rate are greatly extended without a loss of overall efficiency or torque.

It is well known that operating an Alnico magnet near the magnetic flux density point corresponding to the maximum energy product offers the highest energy density machine. Most literature acknowledges this; however, the design point is picked closer to the magnetic flux density remanent point to avoid problems with demagnetization. When the barium or strontium ferrite or rare-earth magnets are used in conjunction with the laminated iron toothed stator core, it appears that the higher the total flux the more powerful or higher energy density machine will be accomplished in practice. The apparent contradiction manifests itself in the basic incompatibility between these later magnets and the traditional stator. It is a hitherto unsuspected discovery of the invention that the "powerfulness" or energy density of electrical machines employing barium or strontium ferrite or rare-earth magnets can be improved by operating the magnets near to the magnetic flux density corresponding to the maximum energy product and, further, providing the aforementioned configuration of the invention. Demagnetization of the magnets does not occur to the same extent as with Alnicos providing another advantage.

The above objects and advantages of the invention are attained in a rotating electrical machine of unique construction—including brushless or brush permanent magnet motors and generators, designed for direct current or alternating current, for continuous or intermittent duty. The unique construction and combination of materials obtains optimum performance for the barium or strontium ferrite magnets, samarium cobalt (rare-earth) magnets, or material of like characteristics as well as optimum utilization of the developed magnetic fields. The use of magnetically soft ferrite in the stator permits proper balance of the magnetic circuit field, for a minimum of magnetomotive force and further extends the operating frequency or rotation rate at a minimum core loss. The inventive machine when fabricated with rare-earth magnets exhibits the highest energy density of any known electrical rotating machine.

DESCRIPTION OF THE PREFERRED EMBODIMENT

Figure 1:
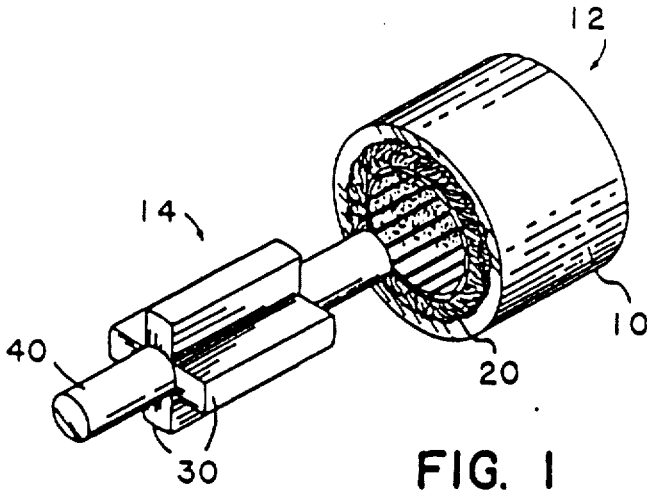
FIG. 1 PRIOR ART
FIG. 1 is an exploded perspective view of a rotating electrical brushless machine of the prior art.

FIG. 1 illustrates a conventional rotating brushless electric machine in which a cylindrically symmetric rotor 14 with permanent magnets 30 is journalled in bearings supporting shaft 40 and rotates inside a concentric wound field stator 12. The alternating current in the winding 20 of the stator 12 is synchronized with the position of the rotor 14 by a mechanism, not shown for the sake of clarity of illustration, to cause motion of that rotor. The electric machine in FIG. 1 is constructed according to principles well known in the prior art.

The rotor 14 is manufactured by bonding the permanent magnets 30 to an iron shaft 40 such that the shaft provides a low reluctance path for the magnetic field generated by the magnets whose polarity is indicated. The magnets 30 are typically samarium cobalt although barium or strontium ferrite magnets are occasionally used.

The stator 12 is manufactured by stamping toothed laminations from sheets of electrical steel or a variety of iron alloys which are stacked employing a variety of well known techniques to form a stator core 10. The winding 20 is then inserted into the slots, after which it is common to pot the entire structure with epoxy or vacuum impregnate it with a varnish.

Figure 2:
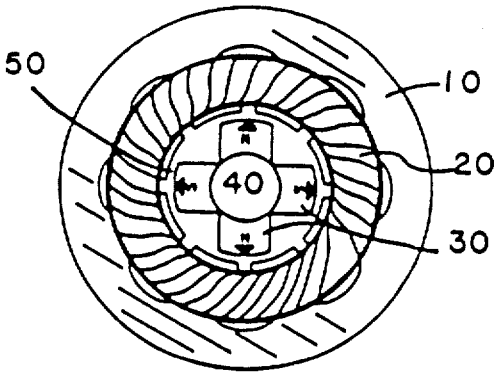
FIG. 2 PRIOR ART
FIG. 2 is an end view of the machine of FIG. 1.

The cross-section view in FIG. 2 of the electric machine of the prior art in FIG. 1 illustrates the employment of a narrow air gap 50. It is instructive to note the operating point of the magnets denoted by X1 in FIG. 6. The low energy density of the magnets at this point of operation, the inefficient use of the stator to support the developed field, and the narrow air gap are characteristic of this configuration and result in a low energy density machine.

Figure 3:
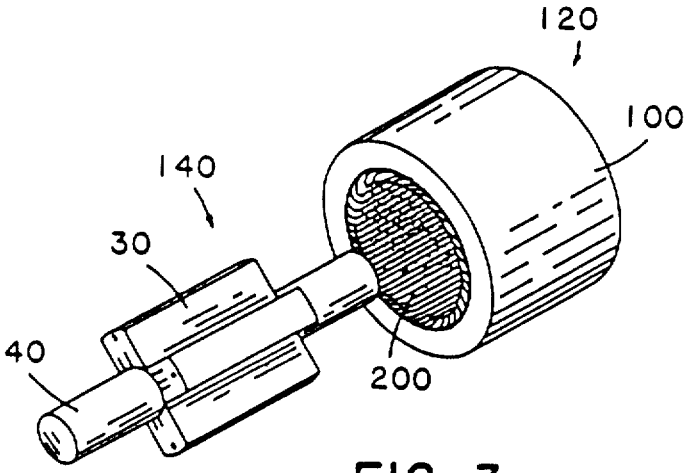
FIG. 3 is an exploded perspective view of a rotating brushless electrical machine of the invention.

The exploded perspective view of FIG. 3 shows the electric machine of the invention with the rotor 140 and the stator 120. The construction of the rotor 140 is identical to the rotor of the prior art 14 except the operating point of the magnet differs substantially. The stator 120 differs in every respect with the stator 12 of the prior art in that the ferrite core 100 and the surface winding 200 in the cross-section view of FIG. 4 of the stator 120 replaces the electrical iron core 10 and the field winding 20 in the cross-section view of FIG. 2 of the stator 12 respectively.

Figure 5:
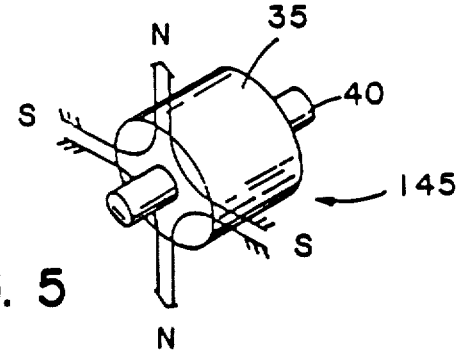
FIG. 5 is a perspective view of an alternate rotor of the invention of four pole construction.

FIG. 5 illustrates an alternative rotor 145 on which the magnets 35 are not segmented but magnetized into an isotropic barium ferrite magnet. The polarities of the illustration indicate a four pole rotor although any multiple of two is feasible. The construction of the rotor is typical of the prior art; however, the operating point of the magnets 35 share a common property with the samarium cobalt magnets 30 as applied and operated in the inventive machine. This common property is the slope of the effective magnetization curve; the only substantial difference between the two types of material magnetically being the magnitude of the maximum energy product.

Figure 6:
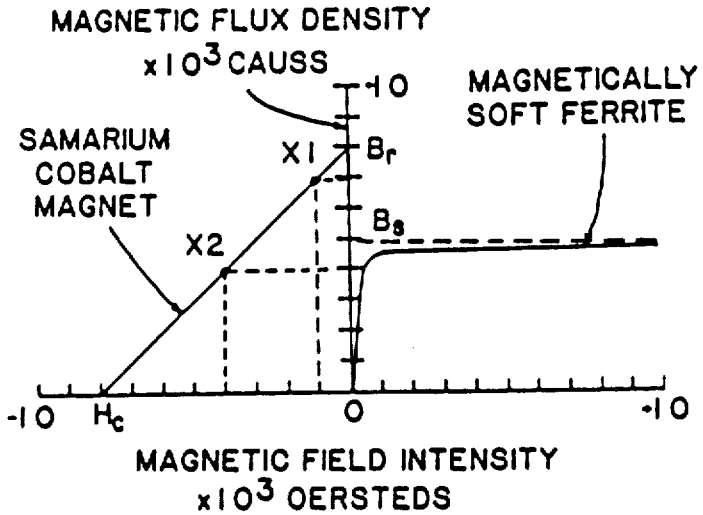
FIG. 6 is an effective magnetization curve for a typical samarium cobalt permanent magnet; and, a virgin magnetization curve for a typical magnetically soft ferrite.

FIG. 6 illustrates the variance in operating points of a samarium cobalt magnet as operated in the prior art and inventive machine being X1 and X2 respectively. The principle reliance of the prior art has been the application of the magnets 30 to the stator 12 for which the operating point X1 is favored as necessitated by the use of an electrical iron toothed laminated stator core 10 further requiring a narrow air gap 50 as shown in FIG.

2. For these reasons, the magnet operating point X2 of the inventive machine for which the energy product is maximized is not considered and cannot be effectuated with out a corresponding improvement in the stator.

Figure 4:
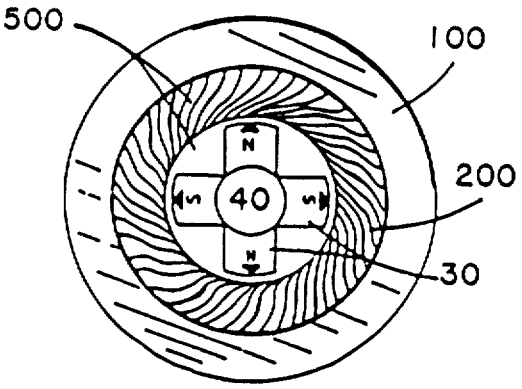
FIG. 4 is an end view of the machine of FIG. 3.

The stator core 100 of the stator 120 of the inventive machine, of which FIG. 4 is a cross section, depicts a substantially cylindrical toroid shape and the widened air gap 500 which is virtually filled with a winding 200. The largest portion of the magnetic fluid is manifested in this widened gap this gap widening being contrary to effective use of space and material as employed by prior art. For these reasons, a widened air gap is not considered in the design of rotating electric machinery. It is a principal, and hitherto unsuspected, discovery of the invention that by widening the air gap the magnet operating point moves from X1 to X2 achieving magnet maximum energy product and utilization of this field may be effectuated by placing the winding 200 into the gap 500.

The application of laminated electrical iron core stators is employed in the prior art, as indicated in the cross section view in FIG. 2. The illustration of FIG. 2 shows a stator 12 employing a stamped lamination electrical iron core 10 upon which a winding 20 is fixed. If a magnetically soft ferrite had been chosen for the core material as suggested by the U.S. Pat. No. 2,885,645 and the British Pat. No. 760,269 (both having non-permanent magnet rotors), the saturation magnetic flux density ($B_f$) of the magnetically soft ferrite as shown in FIG. 6 would have been fundamentally inconsistent with the preferred operating point X1 of the permanent magnets 30. As can be seen in FIG. 6, the magnetically soft ferrite reaches its saturation magnetic flux density long before the permanent magnet reaches its remanent magnetic flux density point.

For these reasons magnetically soft ferrite as a stator core material is not considered in the design of permanent magnet rotating electric machinery, and reliance is placed entirely on the laminated electrical iron core stator discussed above. It is a principal, and hitherto unsuspected, discovery of the invention that magnetically soft ferrite is compatible with certain permanent magnets given the design considerations discussed above. In the principles of the invention, the operating point X2 of the magnets 30, typified by the corresponding magnetization curve in FIG. 6, corresponds to the maximum energy product and the magnetic flux density at point X2 is equal to or less than the saturation magnetic flux density ($B_f$) of the magnetically soft ferrite as typified by the corresponding magnetization curve in FIG. 6.

In addition to the economic advantage of using a magnetically soft ferrite core 100, there is the advantage of low core loss particularly at high frequency or revolution rates. The frequency of the alternating current in the field winding 20 of the stator 12 being synchronized with the position of the rotor 14 increases with the revolution rate of the rotor 14. As the revolution rate is increased, three inter-related effects become increasingly apparent and dominate the performance of the motor until further increase of the revolution rate becomes prohibitive. These three effects correspond to the real and imaginary components of the complex magnetic permeability, the temperature sensitivity of the complex magnetic permeability and the electrical resistivity of the electrical iron core 10.

The imaginary component of the magnetic permeability and the electrical resistivity of the electrical iron generically referred to as core loss give rise to heat which can be removed by conduction. However, as the rotor revolution rate increases these losses increase resulting in a continual degradation of motor efficiency.

As the temperature rises in the stator 10, the real component of the magnetic permeability decreases resulting in lower magnetic flux density which tends to increase the revolution rate of the motor; however, the available torque decreases reducing the motor's ability to supply mechanical power to a load. To maintain a load more current must be supplied to the winding 20 which further aggravates the thermal problem. Provided that low motor efficiency can be tolerated and the generated heat effectively removed, the frequency dependence of the real component of the magnetic permeability results in a decrease of magnetic flux density independent of temperature and loss of mechanical power available to a load necessitating the delivery of more current to the winding 20 which again is self-feating.

The variation of maximum magnetic permeability of electrical irons with frequency of the alternating magnetic fields often decreases in excess of an order of magnitude from 60 to 1000 hertz. Such properties of electrical irons provide limited effective usefulness in high frequency or high revolution rate electric machines resulting in very low efficiencies, non-linear speed-torque characteristics, low torque, and excessive thermal problems.

The preferred embodiment of the invention, as illustrated in FIG. 3 and the cross section of FIG. 4 employs a ferrite core 100. Such ferrite cores may be produced, in the preferred embodiment of the invention, by grinding or machining of a sintered block or form sintering of a core. In particular, the application of any ferrite featuring a spinel crystal structure, and in most cases, conform to the formula $XFe_2O_4$, where X may be manganese, zinc, cobalt, nickel, or other metallic ion or any mixture thereof. Judicious selection of ferrite based on the complex magnetic permeability and saturation flux density will facilitate individual design requirements, the core loss for ferrite being typically three to four orders of magnitude less than the best electrical iron. Additionally, typical values of the cut-off frequency of the initial magnetic permeability of ferrite are greater than the best electrical steel.

It is a hitherto unsuspected discovery of the invention that the proper combination and application of the principles of the invention result in improved energy density, improved efficiency, and radically extend the frequency or revolution rates of permanent magnet electric machines. Typical variations of the brushless electric machine preferred embodiment include permanent magnet D.C. motors, tachometers, alternators, generators, and stepper motors.

In any of these machines, the role of the rotor and stator can be reversed. The permanent magnets can be placed either on the internal or external member, and likewise with the field winding. It is, also, common practice to allow either the rotor or stator to act as the rotating element. The principles fo the invention apply quite generally such that the description of the preferred embodiment is only one variation.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an electrical machine comprising a permanent magnet having a predetermined remanent flux density, a core separated from said permanent magnet by a gap, said magnet, said core and said gap forming a magnetic circuit in which said magnet is at a magnetic flux density and a magnetic field intensity determined by the size of said gap, the product of said flux density and said field intensity corresponding to an energy product, said magnet having a predetermined maximum energy product which occurs at a flux density lower than said remanent flux density, an electrically-conductive winding interposed within said gap between said permanent magnet and said core, and means for permitting relative motion between said permanent magnet and said winding, the improvement which comprises:

(a) means for substantially maximizing the energy product of said magnet by making the size of said gap sufficiently large to limit the flux density of said magnet to a flux density substantially nearer to that corresponding to said predetermined maximum energy product than to said remanent flux density;

(b) said magnet having an effective magnetization curve of a slope corresponding substantially to the slope of the effective magnetization curve of any one of barium ferrite, strontium ferrite [and] *or* rare earth permanent magnets; and (c) said gap being virtually filled with said winding.

2. The electrical machine of claim 1 wherein said means for substantially maximizing the energy product of said magnet includes means for making the size of said gap sufficiently large to limit the flux density of said magnet to a flux density in the vicinity of that corresponding to said predetermined maximum energy product.

3. The electrical machine of claim 1 wherein said magnet is selected from the group consisting essentially of barium ferrite, strontium ferrite, rare earth, [and] *or* mixtures thereof.

4. The electrical machine of claim 1 wherein said core is composed of a magnetically soft ferrite having a predetermined saturation flux density less than said remanent flux density of said permanent magnet, [further including means for making] *with said core being sized relative to said permanent magnet so that* the size of said gap *is* sufficiently large to limit the magnetic flux density of said permanent magnet to a flux density less than said saturation flux density of said magnetically soft ferrite.

*5. The electrical machine of claim 1 wherein said windings virtually filling said gap extend parallel to one another.*

• • • • •